(12) United States Patent
Chung et al.

(10) Patent No.: US 11,777,136 B2
(45) Date of Patent: Oct. 3, 2023

(54) CATHODE ACTIVE MATERIAL FOR SODIUM ION BATTERY, AND PREPARATION PROCESS THEREOF

(71) Applicant: KOREA INSTITUTE OF SCIENCE AND TECHNOLOGY, Seoul (KR)

(72) Inventors: Kyung Yoon Chung, Seoul (KR); Dong Hyun Kim, Seoul (KR); Juhyeon Ahn, Seoul (KR); Jaeho Park, Seoul (KR); Ji-Young Kim, Seoul (KR); Min Kyung Cho, Seoul (KR); Byung Won Cho, Seoul (KR); Hun-Gi Jung, Seoul (KR); Minah Lee, Seoul (KR); Seungho Yu, Seoul (KR); Hyungseok Kim, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 531 days.

(21) Appl. No.: 16/725,656

(22) Filed: Dec. 23, 2019

(65) Prior Publication Data

US 2021/0075053 A1   Mar. 11, 2021

(30) Foreign Application Priority Data

Sep. 9, 2019   (KR) .................... 10-2019-0111691

(51) Int. Cl.
*H01M 10/054* (2010.01)
*H01M 4/04* (2006.01)
(Continued)

(52) U.S. Cl.
CPC ....... *H01M 10/054* (2013.01); *H01M 4/0445* (2013.01); *H01M 4/0459* (2013.01);
(Continued)

(58) Field of Classification Search
None
See application file for complete search history.

(56) References Cited

U.S. PATENT DOCUMENTS

2012/0231351 A1* 9/2012 Jung .................. H01M 4/131
                                                    429/223
2017/0222211 A1* 8/2017 Ryu .................... H01M 4/523
(Continued)

FOREIGN PATENT DOCUMENTS

| CN | 110783525 | * | 2/2020 | ............. Y02E 60/10 |
| KR | 2019081609 | * | 7/2019 | ............. C01G 53/50 |

(Continued)

OTHER PUBLICATIONS

Yongqing Wang et al., "A High-Performance P2-Na0.70Mn0.80Co0.15Zr0.05O2 Cathode for Sodium-Ion Batteries", Applied Materials and Interfaces, American Chemical Society, Nov. 21, 2018, pp. 1-29. (Year: 2018).*

(Continued)

*Primary Examiner* — Jonathan Crepeau
*Assistant Examiner* — Angela J Martin
(74) *Attorney, Agent, or Firm* — Rabin & Berdo, P.C.

(57) ABSTRACT

Disclosed is a method of preparing a cathode active material useful in a sodium ion secondary battery having high reversible capacity and excellent cycle characteristics. The method for preparing a cathode active material composed of $Zr_w$-doped $Na_xLi_yM_zO_a$ includes the steps of (A) doping $Li_yM_zO_a$ with $Zr_w$ to provide $Zr_w$-doped $Li_yM_zO_a$; and (B) dissociating Li ion from the $Zr_w$-doped $Li_yM_zO_a$ and inserting Na ion thereto to provide the $Zr_w$-doped $Na_xLi_yM_zO_a$, wherein M is selected from Ti, V, Cr, Mn, Fe, Co, Ni, Mo, Ru, and combinations thereof, and wherein $0.005<w<0.05$, $0.8 \leq x \leq 0.85$, $0.09 \leq y \leq 0.11$, $7 \leq x/y \leq 10$, $0.7 \leq z \leq 0.95$, and $1.95 \leq a \leq 2.05$. When the cathode active material is used for manufacturing a cathode for a sodium ion secondary battery, (Continued)

the battery can substitute for a conventional, expensive lithium ion secondary battery.

5 Claims, 5 Drawing Sheets

(51) Int. Cl.
| | |
|---|---|
| H01M 4/505 | (2010.01) |
| H01M 10/0525 | (2010.01) |
| H01M 4/525 | (2010.01) |
| H01M 10/0569 | (2010.01) |

(52) U.S. Cl.
CPC .......... *H01M 4/505* (2013.01); *H01M 4/525* (2013.01); *H01M 10/0525* (2013.01); *H01M 10/0569* (2013.01)

(56) References Cited

U.S. PATENT DOCUMENTS

| | | | | |
|---|---|---|---|---|
| 2017/0222225 | A1* | 8/2017 | Kang | H01M 50/20 |
| 2017/0309910 | A1* | 10/2017 | Jo | C01G 51/42 |
| 2017/0317342 | A1* | 11/2017 | Kang | H01M 10/0525 |
| 2020/0335782 | A1* | 10/2020 | Oh | H01M 4/525 |
| 2021/0202940 | A1* | 7/2021 | Li | H01M 4/1391 |

FOREIGN PATENT DOCUMENTS

| | | | |
|---|---|---|---|
| WO | 2004/107480 A2 | 12/2004 | |
| WO | WO 2019132087 | * 7/2019 | ............ H01M 4/485 |

OTHER PUBLICATIONS

Jing Xu et al., "Identifying the Critical Role of Li Substitution in P2-Nax[LiyNizMn1-y-2]O2 (0<x, y, z<1) Intercalation Cathode Materials for High-Energy Na-Ion Batteries", Chemistry of Materials, American Chemical Society, Jan. 3, 2014, pp. 1260-1269. (Year: 2014).*

Jing Xu et al.,"Exploring Li substituted O3-structured layered oxides NaLix Ni1/3-x Mn 1/3+x Co 1/3-x O2 (x=0.07, 0.13, and 0.2) as promising cathode materials for rechargeable Na batteries", Publication Date: Aug. 18, 2005.

Jing Xu et al., "Identifying the Critical Role of Li Substitution in P2-Nax [Liy Niz Mn1-y-z ] O2 (0<x, y, z<1) Intercalation Cathode Materials for High-Energy Na-Ion Batteries", Publication Date: Jan. 3, 2014.

Yongqing Wang et al., "A High-Performance P2-Na0.70Mn0.80Co0.15Zr0.05O2 Cathode for Sodium-Ion Batteries ", Publication Date: Nov. 21, 2018.

* cited by examiner

CATHODE ACTIVE MATERIAL FOR SODIUM ION BATTERY, AND PREPARATION PROCESS THEREOF

CROSS-REFERENCE TO RELATED APPLICATIONS

This application claims, under 35 U.S.C. § 119, the priority of Korean Patent Application No. 10-2019-0111691 filed on Sep. 9, 2019 in the Korean Intellectual Property Office, the disclosure of which is incorporated herein by reference in its entirety.

TECHNICAL FIELD

The following disclosure relates to a cathode active material for a sodium ion secondary battery having high reversible capacity and excellent cycle characteristics, and a method for preparing the same.

BACKGROUND

Recently, lithium ion secondary batteries have been applied widely more and more from portable instruments which are compact electronic instruments to middle- or large-scale energy storage systems for electric vehicles. However, since cost of lithium raw materials may be increased in the future, there is a disadvantage in extended application to middle- or large-scale energy storage systems.

Therefore, as a substitute for lithium materials, a layered compound using sodium ion, $NaMO_2$ (M=Co, Mn, Fe, etc.), has been studied.

It is shown that materials for sodium ion secondary batteries which have been reported recently show capacity similar to the capacity of lithium ion secondary batteries and provide relatively stabilized cycle characteristics. Therefore, it is highly likely that a sodium-based cathode or anode material for a sodium ion secondary battery functions as a substitute for a lithium material in the next-generation middle- or large-scale energy storage systems.

However, although such a sodium-based material shows high initial capacity, its capacity tends to be decreased as charge/discharge cycles are repeated, similarly to the case of lithium. Such a cycle degradation phenomenon results from an irreversible change in structure, i.e. structural instability, caused by intercalation/deintercalation of alkali ion during cycles.

Therefore, sodium ion secondary batteries still show low energy density and a cycle degradation phenomenon so that they may not satisfy the characteristics of large-capacity secondary batteries. Under these circumstances, there is a need for intensive studies to overcome this.

REFERENCES

Patent Document (Patent Document 1) Internal Patent Laid-Open No. 2004-107480

SUMMARY

The present disclosure is designed to solve the problems of the related art, and an embodiment of the present disclosure is directed to providing a cathode active material for a sodium ion secondary battery which shows high reversible capacity and excellent cycle characteristics, when it is applied to secondary batteries, and a cathode for a sodium ion secondary battery using the above-mentioned cathode active material.

The present disclosure is also directed to providing a sodium ion secondary battery which uses the cathode active material and substitutes for an expensive lithium ion secondary battery.

In one general aspect of the present disclosure, there is provided a cathode active material including $Zr_w$-doped $Na_xLi_yM_zO_a$, wherein M is at least one selected from Ti, V, Cr, Mn, Fe, Co, Ni, Mo and Ru, and $0.005<w<0.05$, $0.8 \leq x \leq 0.85$, $0.09 \leq y \leq 0.11$, $7 \leq x/y \leq 10$, $0.7 \leq z \leq 0.95$ and $1.95 \leq a \leq 2.05$.

In another general aspect of the present disclosure, there are provided a cathode including the cathode active material and a sodium ion secondary battery including the cathode.

In still another general aspect of the present disclosure, there is provided a method for preparing a cathode active material including $Zr_w$-doped $Na_xLi_yM_zO_a$, the method including the steps of:

(A) doping $Li_yM_zO_a$ with $Zr_w$; and (B) dissociating Li ion from the $Zr_w$-doped $Li_yM_zO_a$ and inserting Na ion thereto, wherein M is at least one selected from Ti, V, Cr, Mn, Fe, Co, Ni, Mo and Ru, and $0.005<w<0.05$, $0.8 \leq x \leq 0.85$, $0.09 \leq y \leq 0.11$, $7 \leq x/y \leq 10$, $0.7 \leq z \leq 0.95$ and $1.95 \leq a \leq 2.05$.

The cathode active material for a sodium ion secondary battery shows high reversible capacity and excellent cycle characteristics, when it is applied to a secondary battery.

Therefore, when the cathode active material is used for manufacturing a cathode for a sodium ion secondary battery and the cathode is applied to a sodium ion secondary battery, the resultant sodium ion secondary battery can substitute for the expensive conventional lithium ion secondary battery and can be applied to various industrial fields.

DETAILED DESCRIPTION OF EMBODIMENTS

Figure 1:
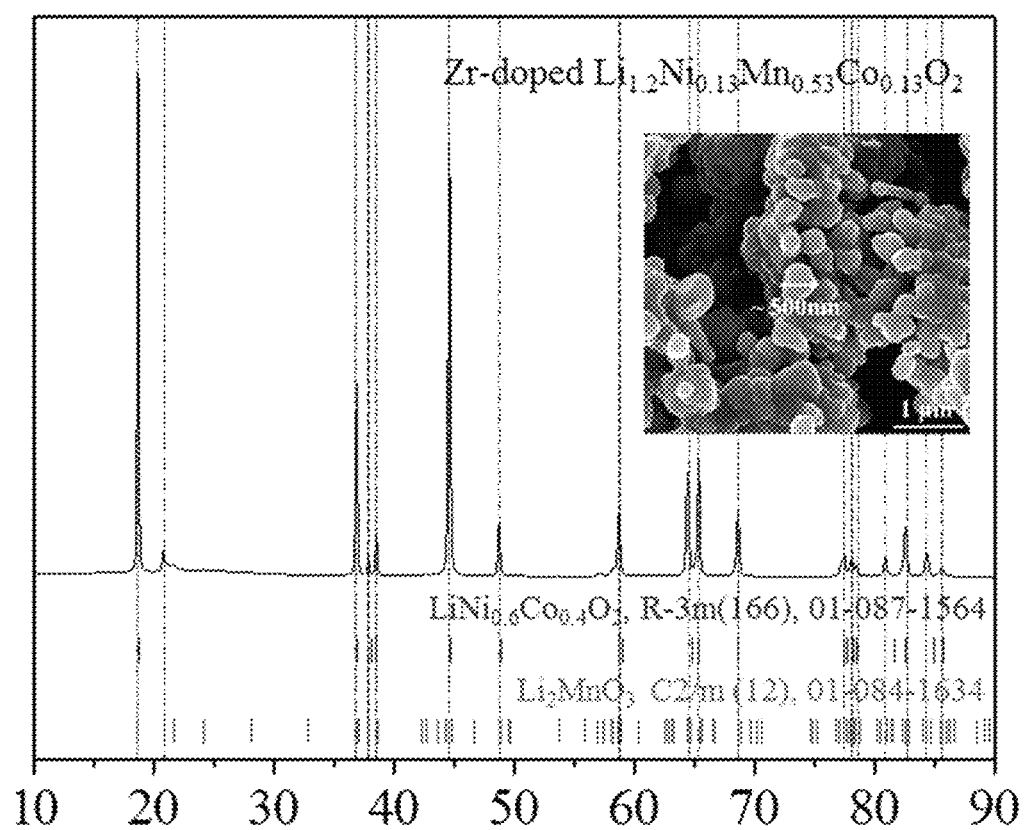
FIG. 1 is a graph illustrating the results of determination of the crystal structure and microstructure of Zr-doped $Li_{1.2}Ni_{0.13}Mn_{0.53}Co_{0.13}O_2$, before insertion of Na, and doped Zr according to an embodiment, as analyzed by X-ray diffractometry (XRD) and scanning electron microscopy (SEM).

Hereinafter, various aspects and embodiments of the present disclosure will be explained in more detail.

In one aspect of the present disclosure, there is provided a cathode active material including $Zr_w$-doped $Na_xLi_yM_zO_a$, wherein M is at least one selected from Ti, V, Cr, Mn, Fe, Co, Ni, Mo and Ru, and $0.005<w<0.05$, $0.8 \le x \le 0.85$, $0.09 \le y \le 0.11$, $7 \le x/y \le 10$, $0.7 \le z \le 0.95$ and $1.95 \le a \le 2.05$.

Herein, Zr functions to enhance cycle life characteristics, and w is preferably larger than 0.005 and smaller than 0.05 (mole). When w is equal to or smaller than 0.005, the cycle life characteristic improvement by Zr is insignificant. And, when w is equal to or larger than 0.05, Zr is doped excessively to cause the problems of degradation of capacity of the secondary battery and formation of an impurity phase caused by Zr content.

Li remains in the cathode active material, since it is not dissociated completely during the preparation of the cathode active material. When Li is totally substituted with Na, no Li remains in the finished cathode active material. However, Li remains preferably, since y is 0.09-0.11 as described hereinafter.

M is a transition metal and is preferably at least one selected from Ti, V, Cr, Mn, Fe, Co, Ni, Mo and Ru.

Particularly, M is $Ni_{z1}Mn_{z2}Co_{z3}$ ($z1=0-0.9$, $z2=0.3-0.9$ and $z3=0-0.9$), and more preferably, z1 is 0.01-0.9, z2 is 0.3-0.9 and z3 is 0.01-0.9.

Even more preferably, z2 is 0.3 (mole) or more. This is because the structure of $Na_{x1}Li_{y1}Mn_{z2}O_{a1}$—$Na_{x2}Li_{y2}Ni_{z1}Co_{z3}O_{a2}$ ($x1+x2=x$, $y1+y2=y$, $z1+z2+z3=z$, $a1+a2=a$) can be formed in this case. It is shown that when the cathode active material is applied to a secondary battery, the structure retains at least 90% of the initial charge/discharge capacity even after repeating 1000 cycles.

In another aspect of the present disclosure, there is provided a method for preparing a cathode active material including $Zr_w$-doped $Na_xLi_yM_zO_a$, the method including the steps of:

(A) doping $Li_yM_zO_a$ with $Zr_w$; and (B) dissociating Li ion from the $Zr_w$-doped $Li_yM_zO_a$ and inserting Na ion thereto, wherein M is at least one selected from Ti, V, Cr, Mn, Fe, Co, Ni, Mo and Ru, and $0.005<w<0.05$, $0.8 \le x \le 0.85$, $0.09 \le y \le 0.11$, $7 \le x/y \le 10$, $0.7 \le z \le 0.95$ and $1.95 \le a \le 2.05$.

The conventional sodium ion secondary battery shows low energy density and a cycle degradation phenomenon so that it may not satisfy the characteristics of a large-capacity secondary battery. Thus, in order to overcome the above-mentioned problem, the inventors of the present disclosure have conducted intensive studies and prepared a cathode active material including a composition of Zr-doped $Na_xLi_yM_zO_a$ through electrochemical Li dissociation and Na insertion.

If a cathode active material is prepared by using a hybrid type without Li dissociation (i.e. when a cathode active material is prepared by using a sodium salt according to the conventional method for manufacturing a sodium ion secondary battery), Na dissolved in the electrolyte causes rapid degradation of reversible capacity due to Na present at high concentration during the dissociation and insertion of alkali ion.

In addition, when preparing a cathode active material non-doped with Zr, even though Li dissociation is carried out, high initial capacity is realized but capacity tends to be decreased after repeating cycles. Such a cycle degradation phenomenon results from an irreversible change in structure, i.e. structural instability, caused by intercalation/deintercalation of alkali ion during cycles. To overcome this, inactive Zr ion is doped according to the present disclosure.

Therefore, in order to provide high reversible capacity and excellent cycle characteristics (to prevent a cycle degradation phenomenon), it is essentially required that Na is inserted through Li dissociation and Zr is doped when preparing the cathode active material, as described above. If not, it is not possible to ensure both desired characteristics. Thus, it is not possible to improve the performance of conventional sodium ion secondary battery. As a result, it is not possible to substitute for the conventional lithium ion secondary battery.

Hereinafter, the method will be explained in more detail.

First, step (A) is a step for doping $Li_yM_zO_a$ with $Zr_w$. Step (A) preferably includes the steps of: (A1) mixing aqueous $Li_yM_zO_a$ solution with aqueous Zr solution, and drying the resultant mixture at a temperature of 50-150° C. for 1-5 hours; and (A2) heat treating the dried mixture.

Preferably, the aqueous $Li_yM_zO_a$ solution is mixed with aqueous Zr solution at a weight ratio of 1:0.5-1.1. When the ratio is not within the above-defined range, Zr cannot form a solid solution with the finished oxide, functions as impurity, and causes loss of capacity due to an increase in Zr.

In step (A2), the heat treatment is carried out in two steps of the first heat treatment and the second heat treatment, wherein the first heat treatment is carried out at a temperature of 400-800° C. for 1-10 hours, and the second heat treatment is carried out at a temperature of 800-1200° C. for 5-15 hours, after carrying out the first heat treatment and pulverizing the resultant powder again. This is for the purpose of providing homogeneous finished oxide by reducing the reaction path between the solid materials remaining after the generated gas is removed through calcination. It is preferred that the second heat treatment temperature is higher than the first heat treatment temperature.

Step (B) is preferably carried out by an electrochemical ion exchange process. The electrochemical ion exchange process includes carrying out initial charge by using a lithium electrode and discharging the secondary battery by using a sodium electrode so that lithium may be substituted with sodium.

More particularly, the electrochemical ion exchange process includes manufacturing a lithium secondary battery including the $Zr_w$-doped $Li_yM_zO_a$ cathode active material, applying electric potential thereto so that the battery may be charged, disassembling the charged lithium secondary battery to exchange the anode with Na metal, and discharging the battery so that lithium may be substituted with sodium.

As described above, according to the present disclosure, there is provided a method for preparing a Zr-doped Na-containing Na—Li-M-O cathode active material by preparing a Zr-doped Na-free Li-M-O cathode active material first (wherein M is at least one selected from Ti, V, Cr, Mn, Fe, Co, Ni, Mo and Ru), removing Li electrochemically, and then adding Na electrochemically thereto.

It is possible to increase the stability of the matrix to which Zr is doped significantly by virtue of the method. In addition, the $Zr_w$-doped $Na_xLi_yM_zO_a$ cathode active material obtained by the method according to the present disclosure satisfies $0.005<w<0.05$, $0.8 \le x \le 0.85$, $0.09 \le y \le 0.11$, $7 \le x/y \le 10$, $0.7 \le z \le 0.95$ and $1.95 \le a \le 2.05$. Only the method according to the present disclosure can satisfy the combination of the above-defined numeral ranges including the ratio of x/y. It is shown that when the combination of the above-defined numeral ranges is satisfied at the same time, the battery including the cathode active material can provide significantly improved performance according to the present disclosure.

The examples and experiments will now be described. The following examples and experiments are for illustrative purposes only and not intended to limit the scope of this disclosure. In addition, it will be apparent to those skilled in the art that various changes and modifications may be made based on the disclosure of the present disclosure including the following examples, and the changes and modifications are also within the scope of the present disclosure as defined in the following claims.

In addition, the following test results merely include typical test examples of examples and comparative examples, and the effects of various embodiments not specified in the following description are described in the corresponding part.

Preparation Example 1: Preparation of Cathode Active Material of $Zr_{0.01}$-doped $Li_{1.2}Ni_{0.13}Mn_{0.53}Co_{0.13}O_2$ First, 5.77 g of $LiNO_3$, 2.58 g of $Ni(NO_3)_2 \cdot 6H_2O$, 2.53 g of $Co(NO_3)_2 \cdot 6H_2O$ and 9.08 g of $Mn(NO_3)_2 \cdot 4H_2O$ were mixed with 23 g of zirconium(IV) acetate hydroxide $((CH_3CO_2)xZr(OH)y, x+y=4)$ solution (1 wt %, solvent: distilled water), and the resultant mixture was allowed to stand at 100° C. for 3 hours to dry it completely. Next, the first heat treatment was carried out at 600° C. for 5 hours and the second heat treatment was carried out at a temperature of 950° C. for 10 hours. Then, the heat treated mixture was subjected to a ball milling process for 30 minutes to obtain a cathode active material of $Li_{1.2}Ni_{0.13}Mn_{0.53}Co_{0.13}O_2$.

Example 1: Preparation of Cathode Active Material of $Na_{0.8}Li_{0.11}Ni_{0.13}Mn_{0.53}Co_{0.13}O_2$ and Manufacture of Sodium Secondary Battery Using the Same The cathode active material of $Li_{1.2}Ni_{0.13}Mn_{0.53}Co_{0.13}O_2$ obtained from Preparation Example 1 was mixed with carbon black (Denka black, Denka Co., Ltd.) and polyvinylidene fluoride (PVDF) binder at a weight ratio of 90:6:4, the mixture was applied to aluminum foil, and then pressing and punching were carried out to obtain a cathode. The cathode and an anode of Li metal were used together with an electrolyte including 1M $LiPF_6$ dissolved in a mixed solvent containing ethylene carbonate (EC):diethylene carbonate (DEC):dimethyl carbonate (DMC) at a ratio of 1:1:1 to assemble a 2032 coin cell. The assembled cell was charged to 4.8V considering the potential window of the electrolyte, and then disassembled. The disassembled cell was washed with DMC solution to remove the Li salt remaining on the electrode surface. Then, for the purpose of application to a high-capacity sodium battery, the washed cathode material and an anode of Na metal were used together with an electrolyte including 1M $NaPF_6$ dissolved in a mixed solvent containing ethylene carbonate (EC):diethylene carbonate (DEC) at a ratio of 1:1 to obtain a 2032 coin-type cell. In this manner, a cathode active material of $Na_{0.8}Li_{0.11}Ni_{0.13}Mn_{0.53}Co_{0.13}O_2$ and a sodium secondary battery including the same were obtained. It is to be noted that a glass separator was used herein, considering formation of Na metal dendrite and impregnation of the electrolyte, and the assembled cell was subjected to charge/discharge in a range of 1.5-4.3V.

Test Example 1: X-Ray Diffractometry and SEM Analysis

To determine the crystal structure and microstructure of Zr-doped $Li_{1.2}Ni_{0.13}Mn_{0.63}Co_{0.13}O_2$, before insertion of Na, and doped Zr according to Example, X-ray diffractometry, scanning electron microscopy (SEM) and X-ray photoelectron spectroscopy (XPS) were carried out. The results are shown in FIGS. 1 and 2.

Figure 2:
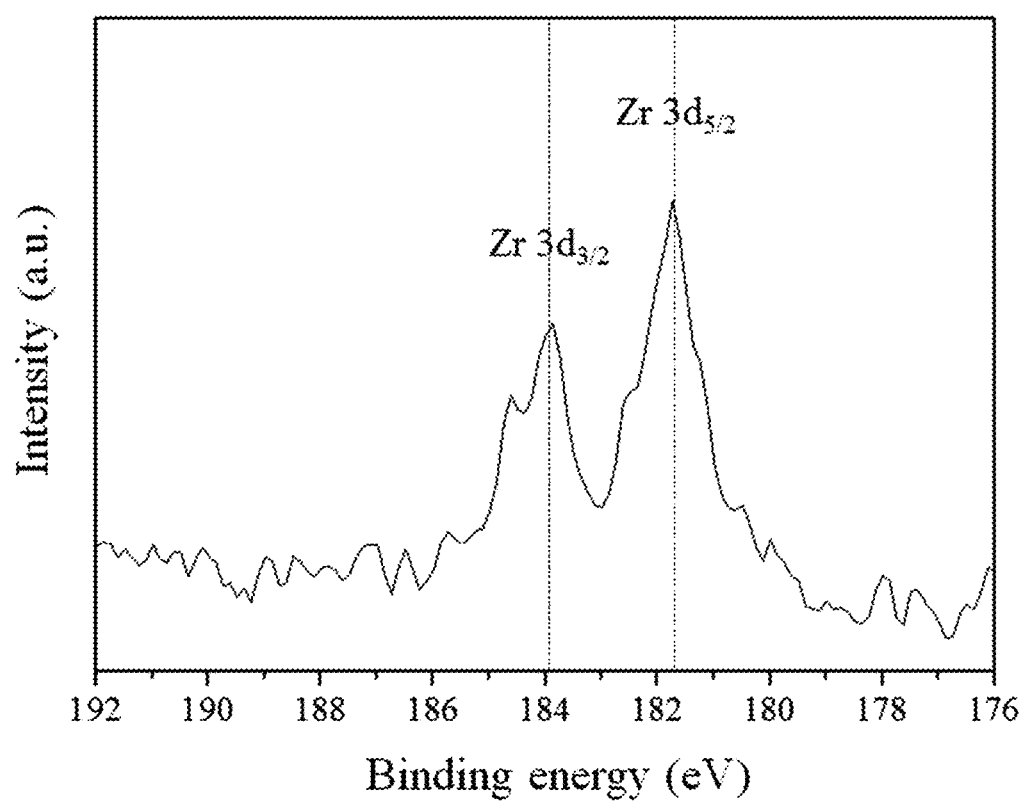
FIG. 2 is a graph illustrating the results of determination of Zr ion doped to the cathode active material according to an embodiment, as analyzed by X-ray photoelectron spectroscopy (XPS).

Referring to FIG. 1, it can be seen that primary particles with a size of 500 nm are aggregated and have an O3-type layered structure with a space group of R-3m.

In addition, a peak is observed at the portion (~22°) represented by the arrow mark. This is a peak defined as $Li_2MnO_3$ and is one generated additionally besides the existing $LiMO_2$ (M=metal) phase. The peak is not generated, when Mn content is low, and effectively functions to improve life characteristics.

Test Example 2: Analysis for Charge/Discharge Capacity of Secondary Battery

The sodium secondary battery according to Example 1 was analyzed for its electrochemical characteristics. The results are shown in FIGS. 3-5.

Figure 3:
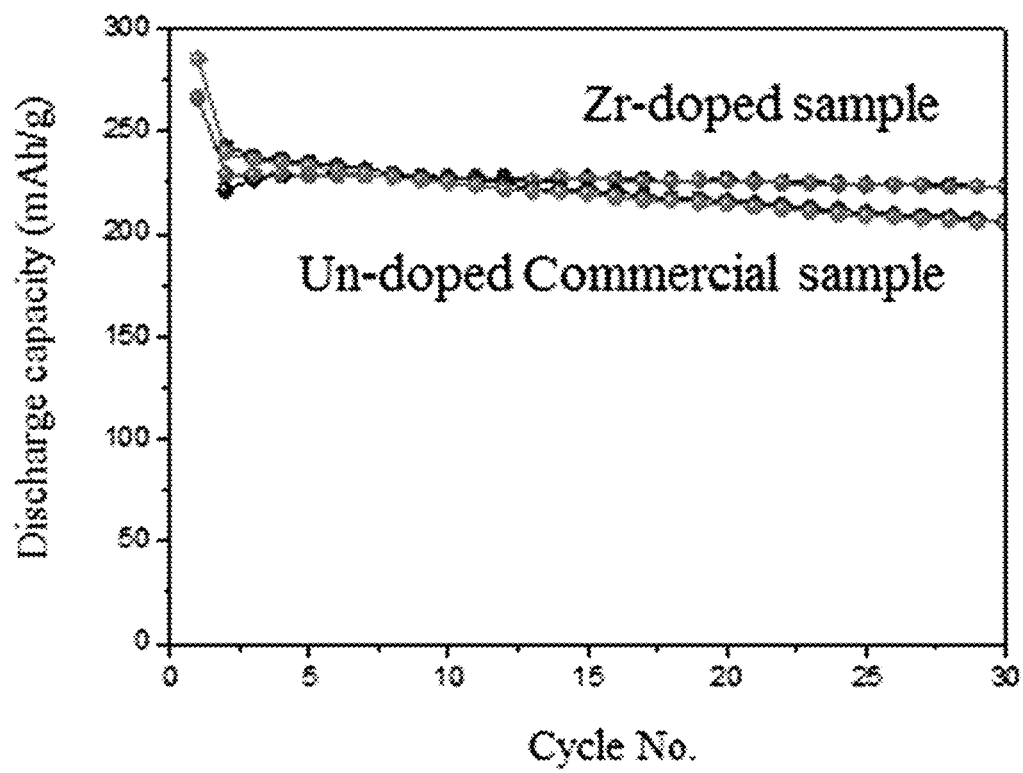
FIG. 3 is a graph illustrating the results of cycle characteristics in the sodium ion secondary battery using $Na_2MnO_3$—$NaMO_2$ (M=Ni, Mn, Co) as a control of the cathode according to Example 1, at 0.1C (1C=200 mAh/g).

First, referring to FIG. 3, it can be seen that the cathode of Example 1 shows a discharge capacity of ~225 mAhg$^{-1}$ and excellent life characteristics under the application of charge/discharge electric current of 0.1C (1C=200 mAh/g) within a voltage range of 1.5-4.3V. On the contrary, the control, non-Zr-doped $Na_2MnO_3$—$NaMO_2$(M=Ni, Mn, Co) shows degradation of discharge capacity as charge/discharge cycles proceed. This suggests that Zr doping results in improvement of cycle life characteristics.

Figure 4:
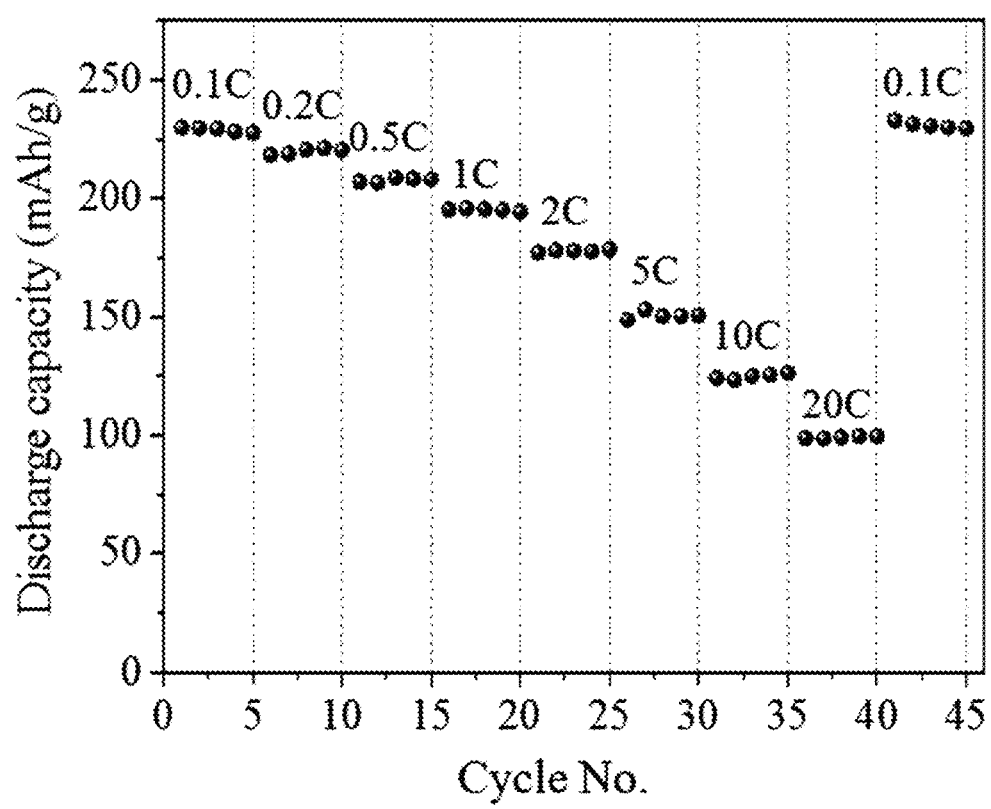
FIG. 4 is a graph illustrating the results of rate characteristics of the sodium ion secondary battery according to Example 1 at 0.10-200 (1C=200 mAh/g).

Referring to FIG. 4, the cathode of Zr-doped $Na_2MnO_3$—$NaMO_2$(M=Ni, Mn, Co) according to Example 1 shows a discharge capacity of 229, 218, 207, 195, 177, 148, 124, 98 mAhg$^{-1}$ under the application of charge/discharge electric current of 0.1, 0.2, 0.5, 1, 2, 5, 10, 20C, respectively, within a voltage range of 1.5-4.3V. In addition, it is shown that when the charge/discharge rate is changed into the initial 0.1C, the unique capacity can be realized stably.

Figure 5:
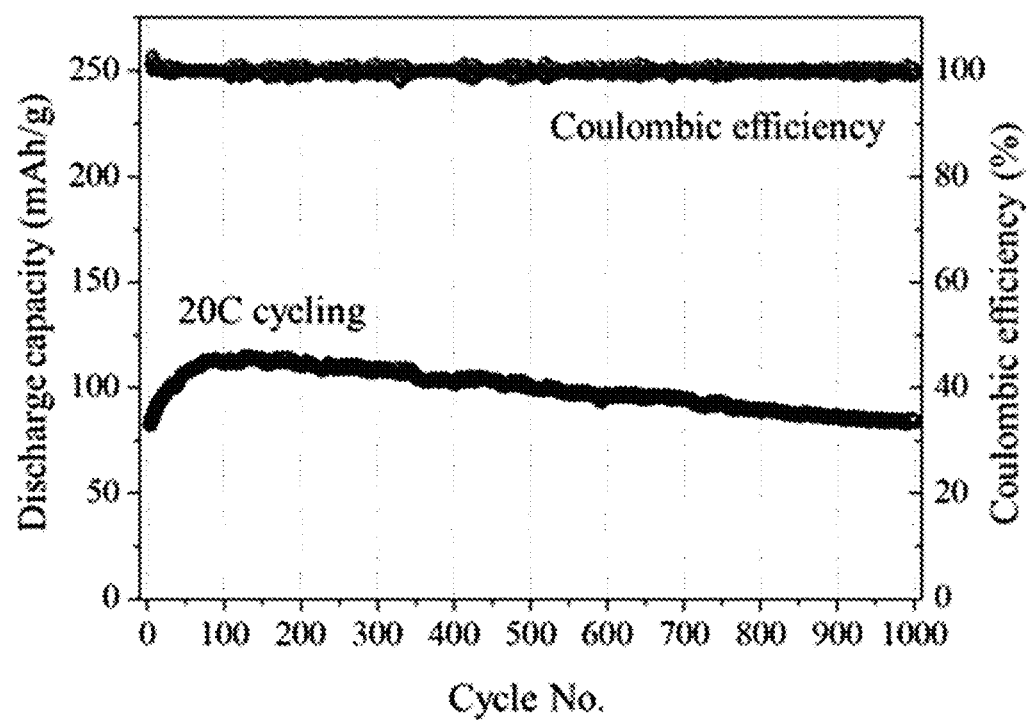
FIG. 5 is a graph illustrating the results obtained after the sodium ion secondary battery according to Example 1 is subjected to 1000 cycles at 20C (1C=200 mAh/g).

Further, referring to FIG. 5, it can be seen that the cathode of Zr-doped $Na_2MnO_3$—$NaMO_2$ (M=Ni, Mn, Co) according to Example 1 shows a discharge capacity corresponding to 73% of the initial capacity during 1000 cycles under the application of high charge/discharge electric current of 20C (1C=200 mAh/g) within a voltage range of 1.5-4.3V. It is thought that Zr doping significantly contributes to the structural stability of the $Na_2MnO_3$—$NaMO_2$ (M=Ni, Mn, Co) cathode material, as compared to pristine $Na_2MnO_3$—$NaMO_2$ (M=Ni, Mn, Co) cathode material.

As can be seen from the foregoing, the cathode active material for a sodium ion secondary battery according to the present disclosure shows high reversible capacity and excellent cycle characteristics, when it is applied to a secondary battery. When the cathode active material is used for manufacturing a cathode for a sodium ion secondary battery and the cathode is applied to a sodium ion secondary battery, the battery can substitute for the conventional expensive lithium ion secondary battery and can be applied to various industrial fields.

What is claimed is:
1. A method for preparing a cathode active material comprising $Zr_w$-doped $Na_xLi_yM_zO_a$ for sodium ion secondary battery, the method comprising the steps of:
  (A) doping $Li_yM_zO_a$ with $Zr_w$ to provide $Zr_w$-doped $Li_yM_zO_a$; and
  (B) dissociating Li ion from the $Zr_w$-doped $Li_yM_zO_a$ and inserting Na ion thereto to provide the $Zr_w$-doped $Na_xLi_yM_zO_a$,
  wherein M is selected from Ti, V, Cr, Mn, Fe, Co, Ni, Mo, Ru, and combinations thereof, and wherein:

0.005<w<0.05, 0.8≤x≤0.85, 0.09≤y≤0.11,

7≤x/y≤10, 0.7≤z≤0.95, and 1.95≤a≤2.05, wherein step (A) comprises the substeps of:
(A1) mixing aqueous $Li_yM_zO_a$ solution with an aqueous Zr solution, and drying the resultant mixture at a temperature of 50-150° C. for 1-5 hours; and
(A2) heat treating the dried mixture,
wherein the aqueous $Li_yM_zO_a$ solution is mixed with the aqueous Zr solution at a weight ratio of 1:0.5 to 1:1.1, in substep (A1).

2. The method for preparing a cathode active material for sodium ion secondary battery according to claim 1, wherein the heat treatment in substep (A2) is accomplished in a first heat treatment and a second heat treatment, the first heat treatment is carried out at a temperature of 400-800° C. for 1-10 hours, and the second heat treatment is carried out at a temperature of 800-1200° C. for 5-15 hours, after carrying out the first heat treatment.

3. The method for preparing a cathode active material for sodium ion secondary battery according to claim 2, wherein the second heat treatment has a temperature that is higher than that of the first heat treatment.

4. The method for preparing a cathode active material for sodium ion secondary battery according to claim 1, wherein step (B) is carried out using an electrochemical ion exchange process.

5. The method for preparing a cathode active material for sodium ion secondary battery according to claim 4, wherein the electrochemical ion exchange process comprises:
manufacturing a lithium secondary battery comprising the $Zr_w$-doped $Li_yM_zO_a$ cathode active material;
applying electric potential thereto so that the battery may be charged; disassembling the charged lithium secondary battery to exchange the anode with Na metal; and
discharging the battery so that lithium may be substituted with sodium.

* * * * *